(12) United States Patent
Kura

(10) Patent No.: US 9,080,530 B2
(45) Date of Patent: Jul. 14, 2015

(54) ELECTRONIC CONTROL APPARATUS AND VEHICLE CONTROL SYSTEM

(75) Inventor: Kaname Kura, Kariya (JP)

(73) Assignee: DENSO CORPORATION, Kariya (JP)

( * ) Notice: Subject to any disclaimer, the term of this patent is extended or adjusted under 35 U.S.C. 154(b) by 1124 days.

(21) Appl. No.: 12/420,255

(22) Filed: Apr. 8, 2009

(65) Prior Publication Data

US 2009/0254242 A1 Oct. 8, 2009

(30) Foreign Application Priority Data

Apr. 8, 2008 (JP) ................................ 2008-100324

(51) Int. Cl.
G06F 19/00 (2011.01)
F02D 41/24 (2006.01)
F02P 5/15 (2006.01)
G07C 5/08 (2006.01)

(52) U.S. Cl.
CPC ............ F02D 41/2487 (2013.01); F02P 5/1514 (2013.01); G07C 5/085 (2013.01); Y02T 10/46 (2013.01)

(58) Field of Classification Search
CPC ........ F02P 5/1514; G07C 5/085; Y02T 10/46
USPC .......................... 701/33, 35, 123; 340/825.69
See application file for complete search history.

(56) References Cited

U.S. PATENT DOCUMENTS 6,195,602 B1 2/2001 Hazama et al.
6,223,730 B1 5/2001 Hasegawa et al.
6,382,188 B2 5/2002 Hasegawa et al.

(Continued)

FOREIGN PATENT DOCUMENTS

JP 2000-259420 9/2000
JP 2002-149412 5/2002

(Continued)

OTHER PUBLICATIONS (OBD II) Title 13, California Code Regulations, Section 1968.2, Malfunction and Diagnostic System Requirements for 2004 and Subsequent Model-Year Passenger Cars, Light-Duty Trucks and Medium-Duty Vehicles and Engines, (No Date), pp. i-iii and pp. 1-143.

(Continued)

Primary Examiner — Redhwan k Mawari
Assistant Examiner — Rodney P King
(74) Attorney, Agent, or Firm — Nixon & Vanderhye PC (57) ABSTRACT

A vehicle electronic control apparatus stores vehicle identification information uniquely assigned to a vehicle and vehicle individual information related to the vehicle. When the vehicle identification information is overwritten with new vehicle identification information, it is determined whether the vehicle identification information is equal to the new vehicle identification information. If it is determined that the vehicle identification information is different than the new vehicle identification information, the vehicle individual information is cleared at a time when the vehicle identification information is overwritten with new vehicle identification information. If it is determined that the vehicle identification information is equal to the new vehicle identification information, the vehicle individual information is not cleared at the time when the vehicle identification information is overwritten with new vehicle identification information.

10 Claims, 8 Drawing Sheets

(56) References Cited

U.S. PATENT DOCUMENTS

| | | | |
|---|---|---|---|
| 6,546,321 B1 | 4/2003 | Ohkubo | |
| 2001/0008134 A1 | 7/2001 | Hasegawa et al. | |
| 2002/0116093 A1* | 8/2002 | Aldrich, III et al. | 701/1 |
| 2006/0250272 A1* | 11/2006 | Puamau | 340/825.69 |
| 2007/0005204 A1 | 1/2007 | Yamamoto et al. | |
| 2007/0129878 A1* | 6/2007 | Pepper | 701/123 |

FOREIGN PATENT DOCUMENTS

| | | |
|---|---|---|
| JP | 2004-136701 | 5/2004 |
| JP | 2004-142511 | 5/2004 |
| JP | 2006-193146 | 7/2006 |
| JP | 2007-179460 | 7/2007 |

OTHER PUBLICATIONS

Japanese Office Action dated Jan. 19, 2010, issued in corresponding Japanese Application No. 2008-100324, with English translation.

Japanese Office Action dated Jun. 1, 2010, issued in corresponding Japanese Application No. 2008-100324, with English translation.

* cited by examiner

| INDIVIDUAL INFORMATION | CLEAR FLAG |
|---|---|
| FUEL INJECTION AMOUNT CORRECT VALUE | 0 |
| FUEL INJECTION TIMING CORRECT VALUE | 0 |
| IGNITION TIMING CORRECT VALUE | 0 |
| ENGINE ACCUMULATIVE OPERATING TIME | 1 |
| ⋮ | ⋮ |

ELECTRONIC CONTROL APPARATUS AND VEHICLE CONTROL SYSTEM

CROSS REFERENCE TO RELATED APPLICATION

This application is based on and incorporates herein by reference Japanese Patent Application No. 2008-100324 filed on Apr. 8, 2008.

FIELD OF THE INVENTION

The present invention relates to an electronic control apparatus that is mounted on a vehicle and stores vehicle identification information uniquely assigned to the vehicle, and also relates to a vehicle control system including multiple electronic control apparatus.

BACKGROUND OF THE INVENTION

Typically, a vehicle electric control unit (ECU) has various types of vehicle information such as fault information, a learned value for vehicle control, and a vehicle identification number (hereinafter, referred to as "VIN code") that is uniquely assigned to a vehicle to identify the vehicle. For example, if the VIN code is lost, the vehicle cannot be identified. Also, if the learned value is lost, vehicle control function may be degraded, and running performance and emission performance of the vehicle may be reduced accordingly. Therefore, a nonvolatile memory such as an electrically erasable programmable read only memory (EEPROM) is used to store such vehicle information so that the vehicle information can be retained even when the ECU is disconnected from a vehicle battery. It is noted that on-board diagnostics (OBD) regulations specify that the fault information should be stored in a nonvolatile memory.

Further, the OBD regulations specify that fault information related to emission of the vehicle should be cleared (i.e., erased) from the memory at the same time when the VIN code is overwritten.

The fact that the VIN code stored in the memory of the ECU is overwritten generally means that the ECU is transferred to another vehicle. Therefore, although the OBD regulations specify nothing about vehicle individual information such as the learning value, it is preferable that the vehicle individual information be cleared (i.e., reset to an initial value) at a time when the VIN code is overwritten. For example, U.S. Pat. No. 6,195,602 corresponding to JP-A-H11-255079 discloses that a VIN code is stored in a nonvolatile memory and that a control program is overwritten at a time when the VIN code is overwritten.

In some cases, the VIN code may be overwritten despite the fact that the ECU remains on the same vehicle. For example, when the VIN code is broken and thus becomes abnormal, the VIN code needs to be corrected by overwriting the abnormal VIN code with a normal VIN code. In this case, the ECU is not transferred to another vehicle. Therefore, it is preferable that the vehicle individual information such as the learned value be not cleared, because the vehicle individual information can continue to be used by the ECU. If the vehicle individual information is cleared despite the fact that the ECU remains on the same vehicle, the vehicle running performance and emission performance may be reduced unnecessarily.

SUMMARY OF THE INVENTION

In view of the above, it is an object of the present invention to provide an electronic control apparatus for preventing vehicle individual information from being cleared unnecessary at a time when vehicle identification information is overwritten. It is another object of the present invention to provide a vehicle control system having multiple electronic control apparatus.

According to an aspect of the present invention, an electronic control apparatus for a vehicle includes an identification information memory device, an individual information memory device, a memory control device, a clear device, an equality determination device, and a clear control device. The identification information memory device stores vehicle identification information uniquely assigned to the vehicle. The individual information memory device stores vehicle individual information related to the vehicle. The memory control device causes the vehicle identification information to be overwritten in response to an overwrite command. The clear device clears the vehicle individual information from the individual information memory device when the vehicle identification information is overwritten. The equality determination device determines whether old vehicle identification information is equal to new vehicle identification information for overwriting the old vehicle identification information. The old vehicle identification information is previously written to the identification information memory device and currently stored in the identification information memory device. The clear control device performs a clear control. The clear control enables the clear device to clear the vehicle individual information upon determination of the equality determination device that the old vehicle identification information is different than the new vehicle identification information. The clear control disables the clear device from clearing the vehicle individual information upon determination of the equality determination device that the old vehicle identification information is equal to the new vehicle identification information.

According to another aspect of the present invention, a vehicle control system includes multiple electronic control apparatus configured to communicate with each other. Each electronic control apparatus includes the identification information memory device, the individual information memory device, the memory control device, the clear device, the equality determination device, and the clear control device.

BRIEF DESCRIPTION OF THE DRAWINGS

The above and other objectives, features and advantages of the present invention will become more apparent from the following detailed description made with check to the accompanying drawings. In the drawings.

DETAILED DESCRIPTION OF THE PREFERRED EMBODIMENTS (First Embodiment)

Figure 1:
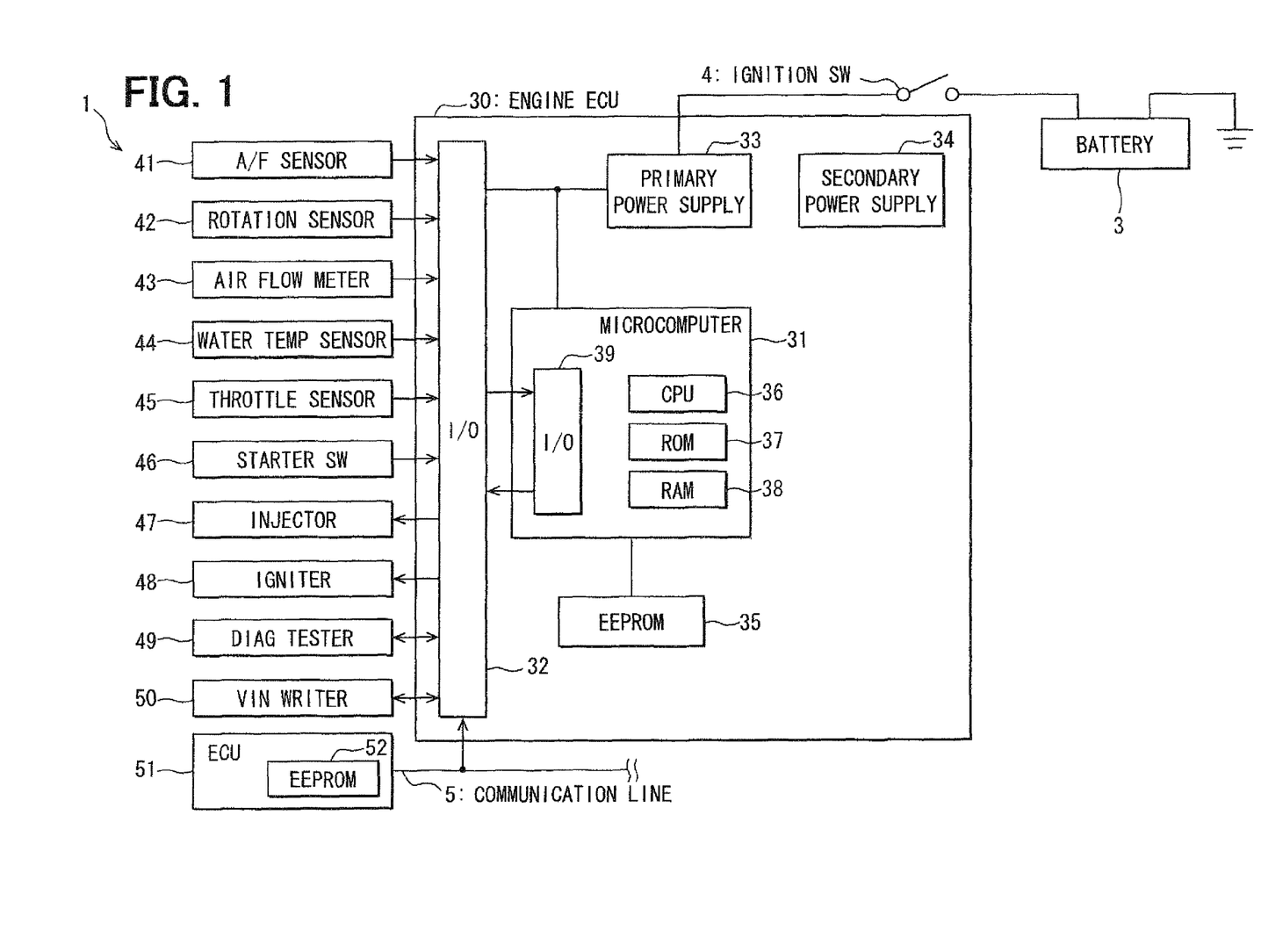
FIG. 1 is a block diagram illustrating an engine control system according to a first embodiment of the present invention.

An engine control system 1 according to a first embodiment of the present invention is described below with reference to FIG. 1. The engine control system 1 mainly includes an engine electronic control unit (ECU) 30 for controlling an engine of a vehicle.

The engine ECU 30 includes a microcomputer 31, an input/output (I/O) circuit 32, a primary power supply 33, a secondary power supply 34, and an nonvolatile memory such as an electrically erasable programmable read only memory (EEPROM) 35. The engine ECU 30 is connected to a communication line 5 of the vehicle via the I/O circuit 32. Also, another ECU 51 is connected to the communication line 5. The other ECU 51 includes an nonvolatile memory such as an EEPROM 52.

The microcomputer 31 includes a central processing unit (CPU) 36, a read only memory (ROM) 37, a random access memory (RAM) 38, and an input/output (I/O) circuit 39. The CPU 36 operates according to a program stored in the ROM 37. When the CPU 36 executes the program, the CPU 36 refers to data stored in the ROM 37. The RAM 38 stores results of computation performed by the CPU 36. The I/O circuit 39 performs input and output of data with an external circuit such as the I/O circuit 32.

For example, the vehicle is equipped with an air-fuel (A/F) ratio sensor 41 for detecting an air-fuel ratio, a rotation sensor 42 for detecting the number of rotations of the engine, an air flow meter 43 for detecting the amount of intake air, a water temperature sensor 44 for detecting a temperature of a coolant, a throttle sensor 45 for detecting a degree of opening of a throttle, and a starter switch 46 for starting the engine. Signals outputted from the A/F ratio sensor 41, the rotation sensor 42, the air flow meter 43, the water temperature sensor 44, the throttle sensor 45, and the starter switch 46 are inputted to the microcomputer 31 through the I/O circuit 32.

The microcomputer 31 outputs control signals to an injector 47 and an igniter 48 through the I/O circuit 32 based on the signals, which are inputted to the microcomputer 31 through the I/O circuit 32. Upon receipt of the control signals, the injector 47 injects fuel into a cylinder of the engine, and the igniter 48 ignites the fuel. Thus, the microcomputer 31 controls operation of the engine.

The engine ECU 30 has an input port to which a diagnostic tester 49 can be connected. The diagnostic tester 49 is a tool used to perform fault diagnosis. In response to a request from the diagnostic tester 49, the engine ECU 30 outputs fault diagnosis information to the diagnostic tester 49. For example, the engine ECU 30 (specifically, microcomputer 31) detects information about emission of the engine and the performs fault diagnosis of operations of the engine and the sensors 41-46 based on the detected information. The fault diagnosis information represents the result of the fault diagnosis.

When an ignition switch 4 is ON, the primary power supply 33 is fed with a battery voltage (e.g., 12 volts) from a battery 3 mounted on the vehicle. For example, the primary power supply 33 steps down the fed voltage to a predetermined level (e.g., 5 volts) and then supplies the stepped-down voltage to the microcomputer 31 and the I/O circuit 32.

Even when the ignition switch 4 is OFF, the secondary power supply 34 is fed with the battery voltage directly from the battery 3 and supplies a predetermined voltage using the fed voltage to, for example, the microcomputer 31. Thus, data stored in the RAM 38 of the microcomputer 31 can be retained, even after the ignition switch 4 is turned OFF.

The EEPROM 35 of the engine ECU 30 stores a vehicle identification number (VIN) code, the fault diagnosis information, a learned value for control, and the like. The VIN code is a unique number assigned to the vehicle to identify the vehicle. For example, the VIN code is determined during a vehicle manufacturing process. The determined VIN code is written to the EEPROM 35 of the engine ECU 30 during the vehicle manufacturing process by connecting a VIN writer 50 to the engine ECU 30. It is noted that the EEPROM 52 of the other ECU 51 can be configured in the same manner as the EEPROM 35.

Figure 2:
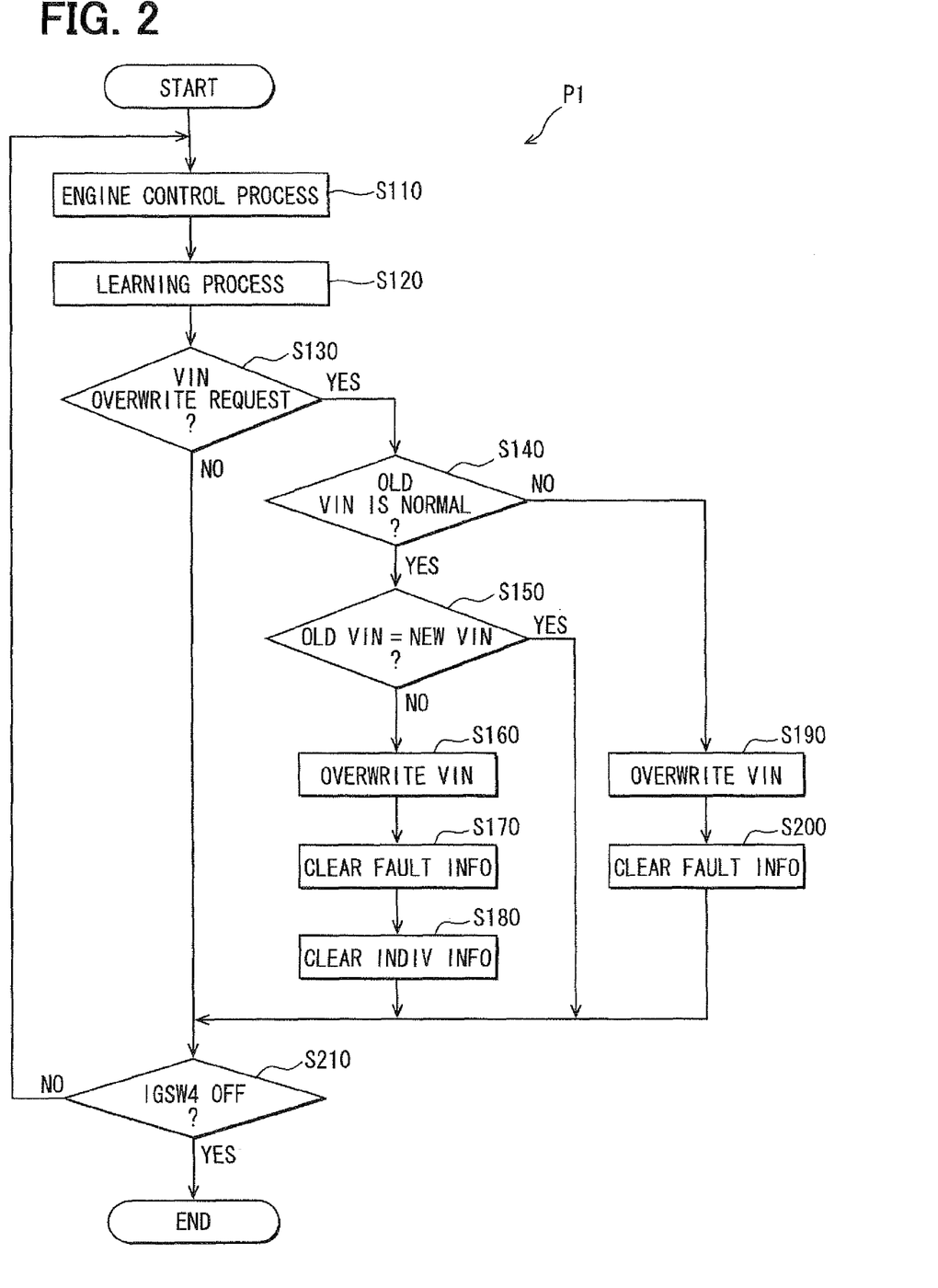
FIG. 2 is a flow diagram illustrating a control process performed by an electronic control apparatus according to the first embodiment.

FIG. 2 is a flow diagram illustrating a flow of a control process P1 performed by the CPU 36 of the microcomputer 31. The CPU 36 starts performing the control process P1, when the ignition switch 4 is turned ON.

The control process P1 starts at S110, where the CPU 36 performs an engine control process. Then, the control process P1 proceeds to S120, where the CPU 36 performs a learning process.

In the engine control process, the injector 47 and the igniter 48 are controlled. Specifically, a fuel injection amount, a fuel injection timing, and an ignition timing are controlled. The learning process includes a computation process for calculating correction values to optimize the fuel injection amount, the fuel injection timing, and the ignition timing and a save process for saving the calculated correction values as learned values.

Then, the control process P1 proceeds to S130, where the CPU 36 determines whether an overwrite command for overwriting the VIN code occurs. For example, the overwrite command is inputted to the engine ECU 30 through the VIN writer 50 together with new VIN code. If the CPU 36 determines that the overwrite command does not occur corresponding to NO at S130, the control process P1 jumps to S210.

At S210, the CPU 36 determines whether the ignition switch 4 of the vehicle is in an OFF state. If the CPU 36 determines that the ignition switch 4 is in the OFF state corresponding to YES at S210, the control process P1 ends.

Conversely, if the CPU 36 determines that the ignition switch 4 is in an ON state corresponding to NO at S210, the CPU 36 returns to S110.

If the CPU 36 determines that the overwrite command occurs corresponding to YES at S130, the control process P1 proceeds to S140.

At S140, the CPU 36 determines whether old VIN code is normal (i.e., not broken). The old VIN code is previously written in the EEPROM 35 and currently stored in the EEPROM 35. For example, the CPU 36 can determine whether the old VIN code is normal by a conventional determination method such as a checksum determination using a check sum, a mirror data determination using mirror data, or a majority determination using multiple data.

If the CPU 36 determines that the old VIN code is normal corresponding to YES at S140, the control process P1 proceeds to S150. At step S150, the CPU 36 determines whether the old VIN code and the new VIN code are equal to each other.

If the CPU 36 determines that the old VIN code and the new VIN code are different than each other corresponding to NO at S150, the control process P1 proceeds to S160. At S160, the CPU 36 rewrites the EEPROM 35 so that the old VIN code can be overwritten with the new VIN code.

Then, the control process P1 proceeds from S160 to S170, where the CPU 36 clears (i.e., deletes) fault information related to emission of the vehicle in accordance with OBD regulations specifying that fault information related to emission should be all cleared when a VIN code is overwritten.

Then, the control process P1 proceeds from S170 to S180, where the CPU 36 clears (i.e., deletes) individual information of the vehicle. For example, the vehicle individual information can include the learned value saved at S120. Then, the control process P1 proceeds from S180 to S210. By the way, if the CPU 36 determines that the old VIN code and the new VIN code are equal to each other corresponding to YES at S150, the control process P1 jumps from S150 to S210.

It is noted that if the CPU 36 determines that the old VIN code is abnormal corresponding to NO at S140, the control process P1 proceeds from S140 to S190.

At step S190, the CPU 36 rewrites the EEPROM 35 so that the old VIN code can be overwritten with the new VIN code.

Then, the control process P1 proceeds from S190 to S200, where the CPU 36 clears (i.e., deletes) the vehicle fault information related to emission in accordance with the OBD regulations. Then, the control process P1 proceeds from S200 to S210. In this way, when it is determined at S140 that the old VIN code is abnormal, the vehicle individual information is not cleared irrespective of whether the old VIN code is equal to the new VIN code.

It is noted that the fact that the old VIN code is abnormal can mean that the old VIN code needs to be corrected only. That is, since the engine ECU 30 remains on the same vehicle (i.e., is not transferred to another vehicle), there is no need to clear the vehicle individual information.

As described above, according to the first embodiment, when it is determined that the old VIN code is abnormal (NO at S140), the vehicle individual information such as the learned value is not cleared. In such an approach, it is prevented that the vehicle individual information is unnecessarily cleared. As a result, the vehicle individual information continues to be used by the engine ECU 30 so that vehicle control function cannot be degraded.

Further, according to the first embodiment, when the old VIN code is normal (YES at S140), and the old VIN code is equal to the new VIN code (YES at S150), the vehicle fault information and the vehicle individual information are not cleared. This is because the fact that the old VIN code is normal and equal to the new VIN code can mean that the engine ECU 30 remains on the same vehicle.

Further, according to the first embodiment, when the old VIN code is normal (YES at S140), and the old VIN code is different than the new VIN code (NO at S150), the vehicle individual information is cleared (S180). This is because that the fact that the old VIN code is normal and different from the new VIN code can mean that the engine ECU 30 is transferred to another vehicle. Since the vehicle individual information is initialized, the engine ECU 30 can relearn vehicle individual information for the other vehicle from an initial value.

The EEPROM 35 can serve as an identification information memory device and an individual information memory device. S180 can serve as a clear device. S150 can serve as a clear control device and an equality determination device. S140 can serve as an abnormality determination device.

By the way, according to the first embodiment, as long as the old VIN code is abnormal, the vehicle individual information such as the learned value is not cleared irrespective of whether the engine ECU 30 is transferred to another vehicle. This may not be a problem, because the leaned value can approach a suitable value for the other vehicle as the engine ECU 30 performs relearning on the other vehicle.

(Second Embodiment)

A second embodiment of the present invention is described below with reference to FIG. 3. A difference between the first and second embodiments is that the CPU 36 of the microcomputer 31 performs a control process P2 illustrated in FIG. 3 instead of the control process P1 illustrated in FIG. 2.

A difference between the control processes P1, P2 is that the control process P2 further has S300 followed by S200. That is, after the vehicle fault information related to emission of the vehicle is cleared at S200, the control process P2 proceeds to S300. At S300, the CPU 36 clears the vehicle individual information. Then, the control process P2 proceeds from S300 to S210.

According to the second embodiment, when the old VIN code is normal (YES at S140), and the old VIN code is equal to the new VIN code (YES at S150), the vehicle individual information is not cleared. This is because the fact that the old VIN code is normal and equal to the new VIN code can mean that the engine ECU 30 remains on the same vehicle (i.e., is not transferred to another vehicle). In other cases, the vehicle individual information is cleared. Specifically, the vehicle individual information is cleared, when the old VIN code is abnormal, or when the old VIN code is normal and is different than the new VIN code.

As described previously, in the first embodiment, as long as the old VIN code is abnormal, the vehicle individual information is not cleared irrespective of whether the engine ECU 30 is transferred to another vehicle.

In contrast, in the second embodiment, as Tong as the old VIN code is abnormal, the vehicle individual information is cleared irrespective of whether the engine ECU 30 is transferred to another vehicle. In such an approach, the vehicle individual information can be cleared, even if the old VIN code happens to be abnormal at a time when the engine ECU 30 is transferred to another vehicle.

(Third Embodiment)

A third embodiment of the present invention is described below with reference to FIG. 4. A difference between the second and third embodiments is as follows.

As described previously, in the second embodiment, as long as the old VIN code is abnormal, the vehicle individual information is cleared.

Figure 3:
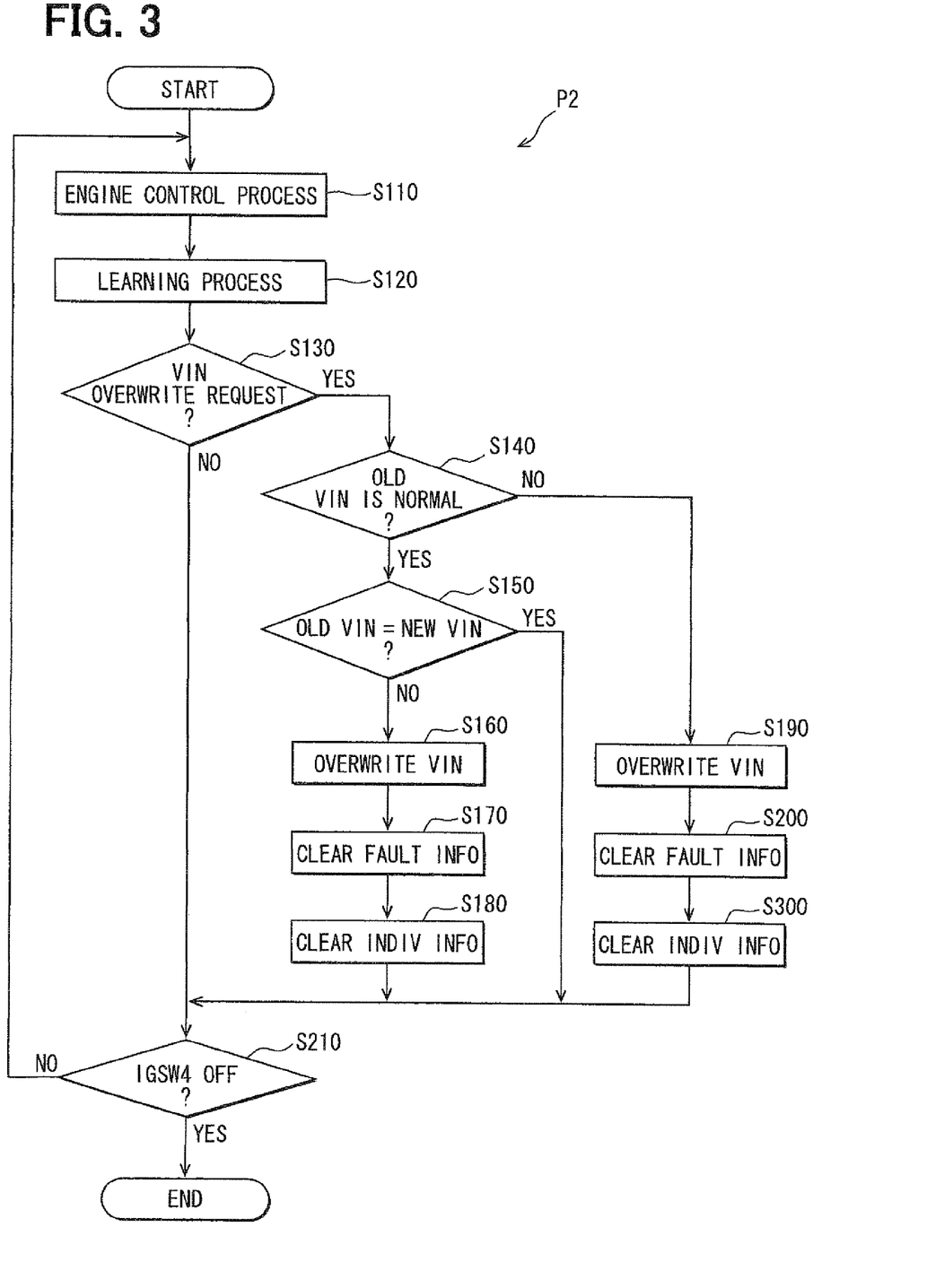
FIG. 3 is a flow diagram illustrating a control process performed by an electronic control apparatus according to a second embodiment of the present invention.

In contrast, in the third embodiment, when the old VIN code is abnormal, it is determined at S300 of FIG. 3 whether the vehicle individual information is cleared based on clear information (i.e., clear flag). It is noted that at S180 of FIG. 3 the vehicle individual information is always cleared regardless of the clear flag.

Figure 4:
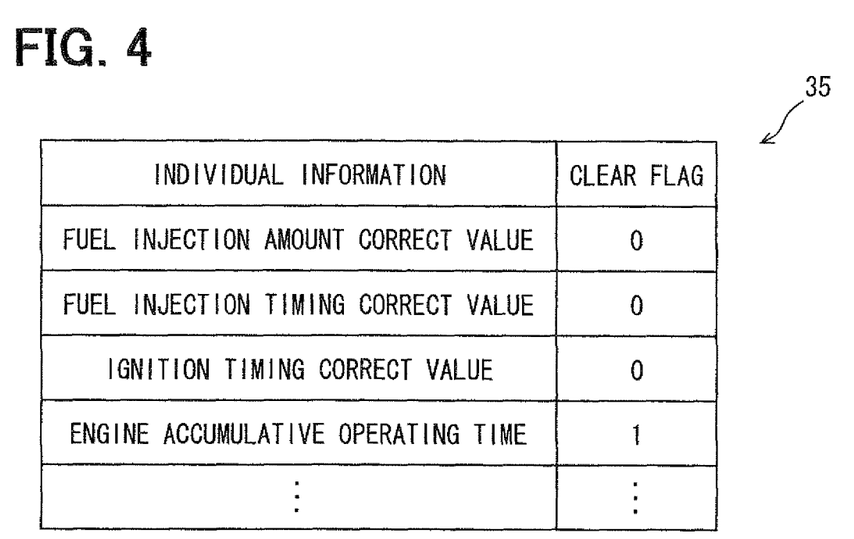
FIG. 4 is a diagram illustrating a manner in which a memory of the electronic control apparatus of FIG. 3 stores information.

For example, the EEPROM 35 stores the vehicle individual information in a manner shown in FIG. 4. The vehicle individual information can include multiple vehicle individual information items having different types. As shown in FIG. 4, examples of the vehicle individual information items can include a fuel injection amount correction value, a fuel injection timing correction value, an ignition timing correction value, and an engine accumulative operating time value. For example, these correction values are calculated and saved in the EEPROM 35 at S120 (refer to FIGS. 2, 3).

As can be seen from FIG. 4, the clear flag is respectively associated with each vehicle individual information item and stored in the EEPROM 35. For example, in FIG. 4, "0" represents that the vehicle individual information item is disabled to be cleared, and "1" represents that the vehicle individual information item is enabled to be cleared.

According to the third embodiment, at S300 of the control process P2 illustrated in FIG. 3, the CPU 36 of the microcomputer 31 determines whether each vehicle individual information item is cleared based on the respective clear flag. Specifically, in the case of FIG. 4, the engine accumulative operating time is cleared, whereas the fuel injection amount correction value, the fuel injection timing correction value, and the ignition timing correction value are not cleared. The clear flag is prestored as program data in the engine ECU 30. Alternatively, the clear flag can be written to the engine ECU 30 through a predetermined tool such as the VIN writer 50 by a vehicle maintenance worker, for example.

In such an approach, it is possible for, for example, the maintenance worker to choose whether to set the clear flag to "0" or "1" per each vehicle individual information item. For example, the engine accumulative operating time cannot be used in another vehicle. Therefore, it is preferable that a clear flag for the engine accumulative operating time be set to "1" as shown in FIG. 4.

In the third embodiment, the EEPROM 35 can serve as a clear information memory device.

(Fourth Embodiment)

Figure 5:
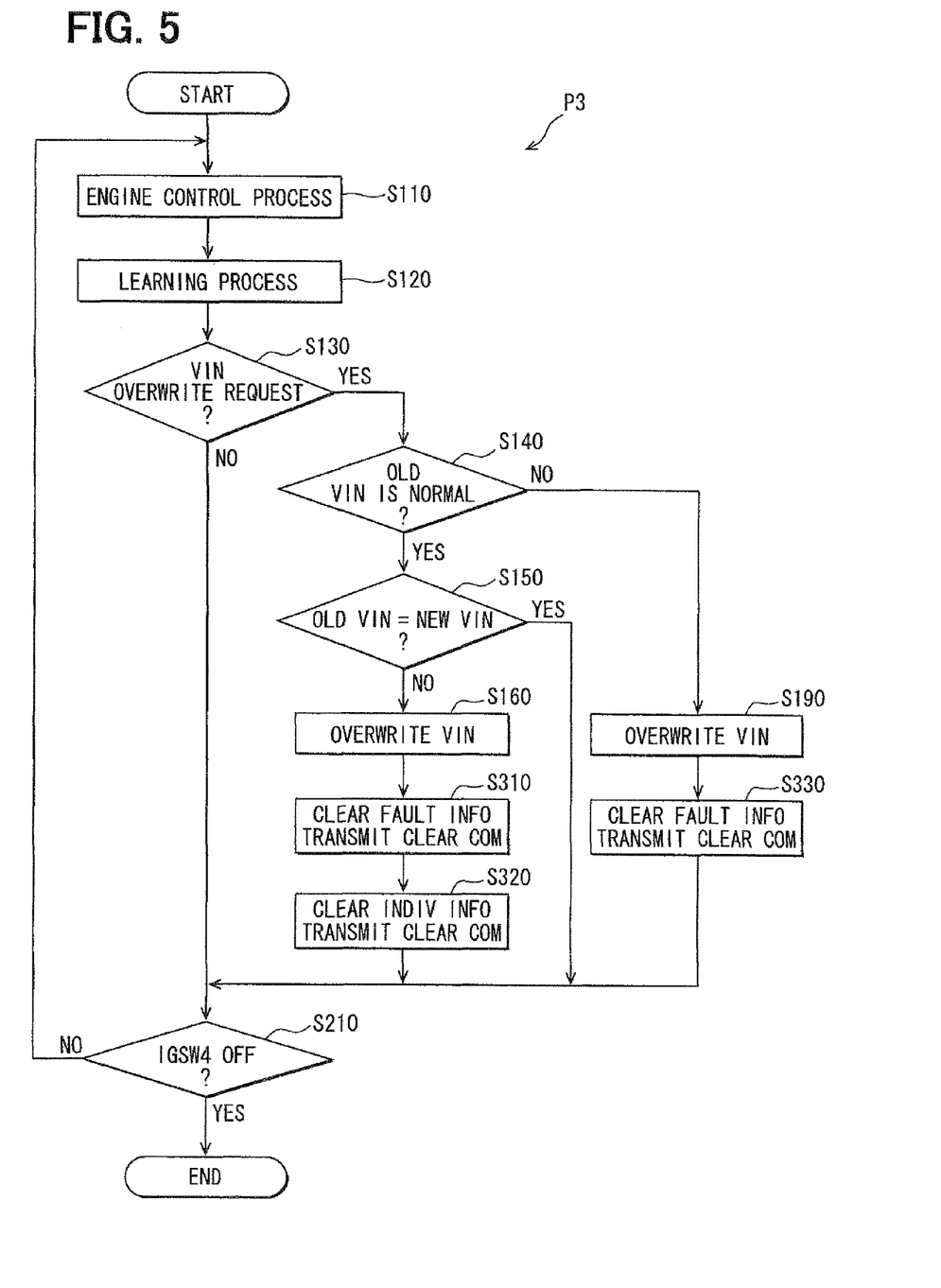
FIG. 5 is a flow diagram illustrating a control process performed by an electronic control apparatus according to a fourth embodiment of the present invention.

A fourth embodiment of the present invention is described below with reference to FIGS. 5 and 6. A difference between the first and fourth embodiments is that the CPU 36 of the microcomputer 31 performs a control process P3 illustrated in FIG. 5 instead of the control process P1 illustrated in FIG. 2.

In the fourth embodiment, after the CPU 36 rewrites the EEPROM 35 at S160 so that the old VIN code can be overwritten with the new VIN code, the control process P3 proceeds to S310. At S310, the CPU 36 clears the vehicle fault information related to emission of the vehicle. Further, at S310, the CPU 36 transmits a fault information clear command through the I/O circuits 32, 39 to the other ECU 51, which is coupled to the communication line 5.

Then, the control process P3 proceeds from S310 to S320, where the CPU 36 clears the vehicle individual information. Further, at S320, the CPU 36 transmits an individual information clear command through the I/O circuits 32, 39 to the other ECU 51, which is coupled to the communication line 5. Then, the control process P3 proceeds from S320 to S210.

Also, in the fourth embodiment, after the CPU 36 rewrites the EEPROM 35 at S190 so that the abnormal old VIN code can be corrected, the control process P3 proceeds to S330, where the CPU 36 clears the vehicle fault information related to emission of the vehicle. Further, at S330, the CPU 36 transmits the fault information clear command through the I/O circuits 32, 39 to the other ECU 51, which is coupled to the communication line 5. Then, the control process P3 proceeds from S330 to S210.

As described above, the fourth embodiment is configured in a manner similar to the first embodiment. Specifically, the vehicle individual information is not cleared, and the individual information clear command is not transmitted, as long as the old VIN code is abnormal (NO at S140). This is to the same effect as the first embodiment.

Further, each of the vehicle fault information and the vehicle individual information is not cleared, and each of the fault and individual clear commands is not transmitted, when the old VIN code is normal (YES at S140), and the old VIN code is equal to the new VIN code (YES at S150).

Conversely, each of the vehicle fault information and the vehicle individual information is cleared (S310, S320), and each of the fault and individual clear commands is transmitted (S310, S320), when the old VIN code is normal (YES at S140) and different from the new VIN code (NO at S150).

Figure 6:
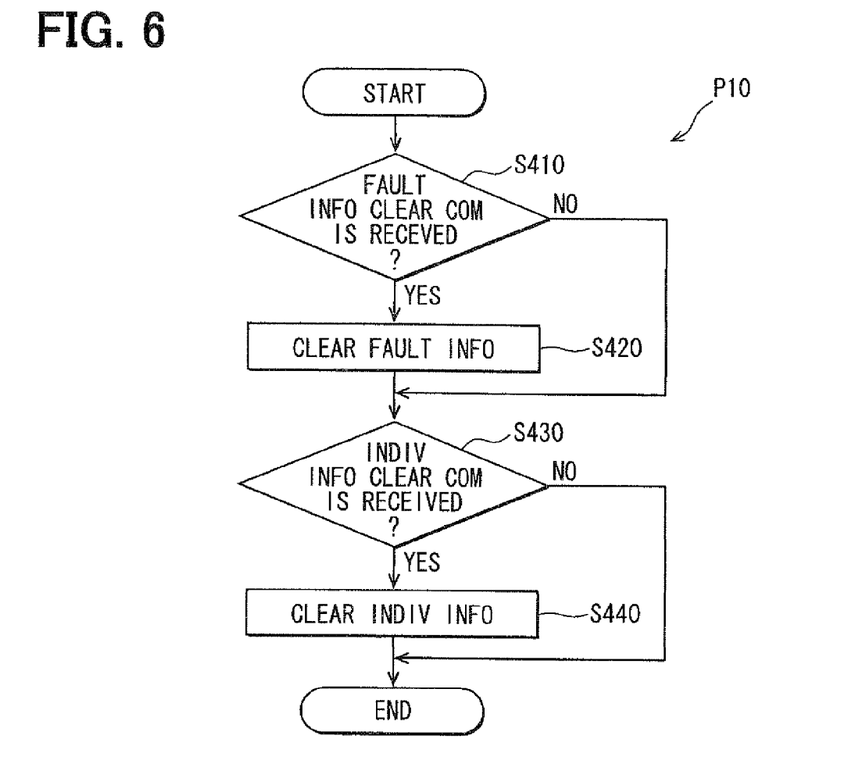
FIG. 6 is a flow diagram illustrating a control process performed by another electronic control apparatus according to the fourth embodiment.

It is noted that a CPU (not shown) of the other ECU 51 performs a control process P10 illustrated in FIG. 6 at regular time intervals.

The control process P10 starts at S410, where the CPU determines whether the other ECU 51 receives the fault information clear command. As described above, the fault information clear command is transmitted from the engine ECU 30 to the other ECU 51 at S310 or S330.

If the CPU determines that the other ECU 51 does not receive the fault information clear command corresponding to NO at S410, the control process P10 jumps to S430.

Conversely, if the CPU determines that the other ECU 51 receives the fault information clear command corresponding to YES at S410, the control process P10 proceeds to S420, where the CPU clears vehicle fault information stored in the other ECU 51. Then, the control process P10 proceeds to S430.

At S430, the CPU determines whether the other ECU 51 receives the individual information clear command. As described above, the individual information clear command is transmitted from the engine ECU 30 to the other ECU 51 at S320.

If the CPU determines that the other ECU 51 does not receive the individual information clear command corresponding to NO at S430, the control process P10 ends. Conversely, if the CPU determines that the other ECU 51 receives the individual information clear command corresponding to YES at S430, the control process P10 proceeds to S440, where the CPU clears vehicle individual information stored in the other ECU 51. Then, the control process P10 ends. In the other ECU 51, the vehicle fault information and the vehicle individual information can be stored in the EEPROM 52, for example.

As described above, according to the fourth embodiment, the vehicle fault information and the vehicle individual information stored in the other ECU 51 can be cleared immediately when the vehicle fault information and the vehicle individual information stored in the engine ECU 30 are cleared. In this way, the vehicle fault information and the vehicle individual information stored in the other ECU 51 can be cleared automatically. Further, the fourth embodiment can have the same effect as the first embodiment.

In the fourth embodiment, S310, S320, S330 serve as a clear command transmission device, and the I/O circuits 32, 39 can serve as a clear command receiving device.

(Fifth Embodiment)

A fifth embodiment of the present invention is described below with reference to FIG. 7. In the fifth embodiment, the engine ECU 30 (i.e., CPU 36) overwrites the VIN code in response to an overwrite command received from the VIN writer 50. When the engine ECU 30 finishes overwriting the VIN code, the engine ECU 30 transmits an overwrite completion code to the VIN writer 50.

Specifically, in the fifth embodiment, the control process P1 illustrated in FIG. 2 is modified such that a process for transmitting the overwrite completion code is added after each of S180 and S200, and the engine ECU 30 performs the modified control process P1.

Figure 7:
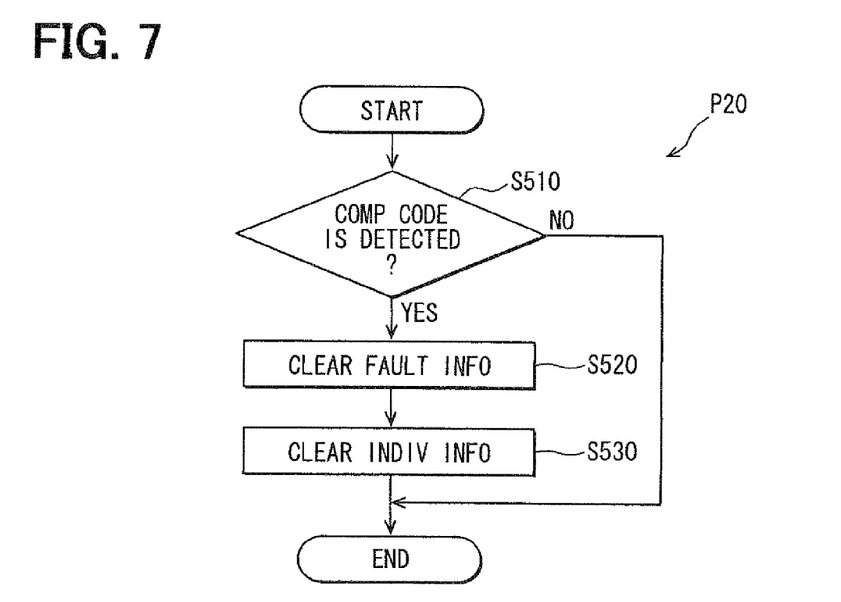
FIG. 7 is a flow diagram illustrating a control process performed by another electronic control apparatus according to a fifth embodiment of the present invention.

Further, in the fifth embodiment, the other ECU 51 performs a control process P20 illustrated in FIG. 7.

The control process P20 starts at S510, where the other ECU 51 determines whether the overwrite completion code is detected. That is, the other ECU 51 monitors communication between the engine ECU 30 and the VIN writer 50.

If the other ECU 51 determines that the overwrite completion code is not detected corresponding to NO at S510, the control process P20 ends. Conversely, if the other ECU 51 determines that the overwrite completion code is detected corresponding to YES at S510, the control process P20 proceeds from S510 to S520, where the other ECU 51 clears vehicle fault information stored in the other ECU 51.

Then, the control process P20 proceeds to S530, where the other ECU 51 clears vehicle individual information stored in the other ECU 51. The vehicle fault information and the vehicle individual information are stored in the EEPROM 52, for example.

As describe above, according to the fifth embodiment, the other ECU 51 monitors communication between the engine ECU 30 and the VIN writer 50 to detect the overwrite completion code transmitted from the engine ECU 30 to the VIN writer 50. Upon detection of the overwrite completion code, the vehicle fault information and the vehicle individual information stored in the other ECU 51 are cleared. In such an approach, the vehicle fault information and the vehicle individual information stored in the other ECU 51 can be cleared immediately when the vehicle fault information and the vehicle individual information stored in the engine ECU 30 are cleared. In this way, the vehicle fault information and the vehicle individual information stored in the other ECU 51 can be cleared automatically. That is, the fifth embodiment can have the same effect as the fourth embodiment.

In the fifth embodiment, S510 can serve as a monitor device. The VIN writer 50 can serve as an external apparatus.

It is noted that the VIN code stored in the other ECU 51 can be overwritten through the VIN writer 50. Further, the engine ECU 30 can perform the control process P20 illustrated in FIG. 7. That is, the engine ECU 30 can monitor communication between the other ECU 51 and the VIN writer 50 to detect whether the vehicle fault information and the vehicle individual information stored in the other ECU 51 are cleared. Thus, the vehicle fault information and the vehicle individual information stored in the engine ECU 30 can be cleared immediately when the vehicle fault information and the vehicle individual information stored in the other ECU 51 are cleared.

(Sixth Embodiment)

Figure 8:
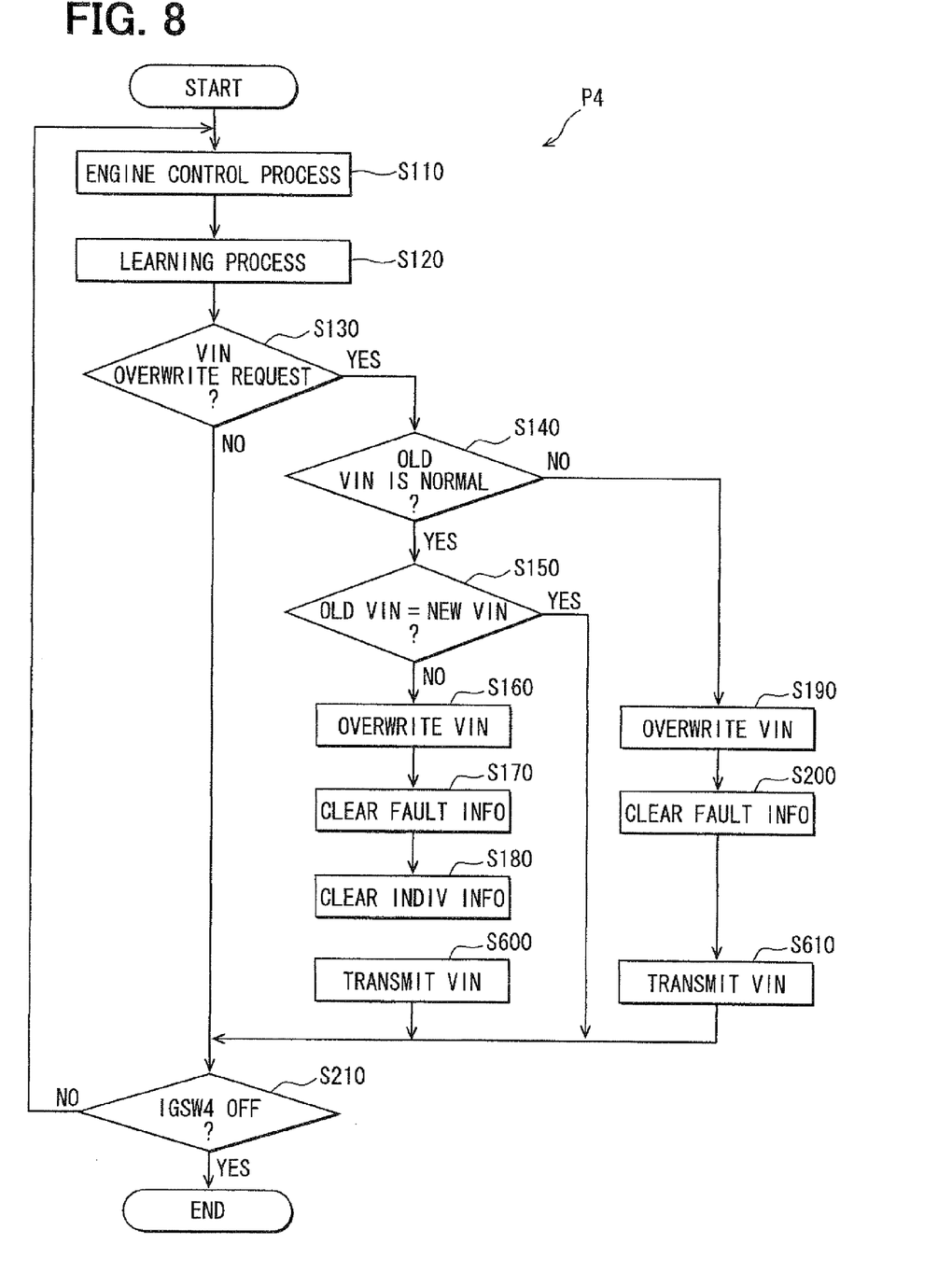
FIG. 8 is a flow diagram illustrating a control process performed by an electronic control apparatus according to a sixth embodiment of the present invention.

A sixth embodiment of the present invention is described below with reference to FIGS. 8 and 9. A difference between the first and sixth embodiments is that the CPU 36 of the microcomputer 31 performs a control process P4 illustrated in FIG. 8 instead of the control process P1 illustrated in FIG. 2. Further, the CPU of the other ECU 51 performs a control process P30 illustrated in FIG. 9 at regular time intervals.

A difference between the control processes P1, P4 is that the control process P4 further has S600 followed by S180 and S610 followed by S200. At S600, the CPU 36 transmits the new VIN code to the other ECU 51, which is coupled to the communication line 5. At S610, the CPU 36 transmits the corrected VIN code to the other ECU 51, which is coupled to the communication line 5.

Figure 9:
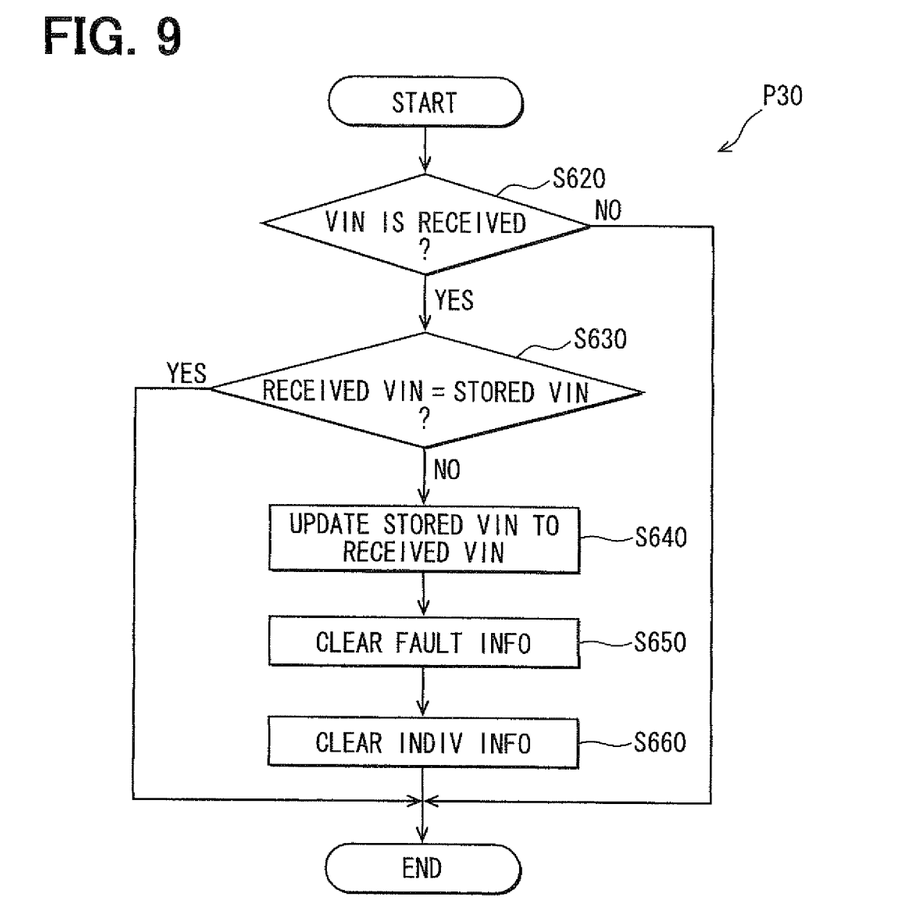
FIG. 9 is a flow diagram illustrating a control process performed by another electronic control apparatus according to the sixth embodiment.

As shown in FIG. 9, the control process P30 starts at S620, where the other ECU 51 determines whether the other ECU 51 receives the VIN code that is transmitted from the engine ECU 30 at S600 or S610 of the control process P4.

If the other ECU 51 determines that the other ECU 51 does not receive the VIN code corresponding to NO at S620, the control process P30 ends. Conversely, if the other ECU 51 determines that the other ECU 51 receives the VIN code corresponding to YES at S620, the control process P30 proceeds to S630. At S630, the other ECU 51 determines whether the received VIN code is equal to the VIN code stored in the EEPROM 52. The VIN code stored in the EEPROM 52 can be a VIN code written at S640 as described later. Alternatively, the VIN code stored in the EEPROM 52 can be a VIN code written through the VIN writer 50.

If the other ECU 51 determines that the received VIN code is equal to the stored VIN code corresponding to YES at S6301 the control process P30 ends. Conversely, if the other ECU 51 determines that the received VIN code is different from the stored VIN code corresponding to NO at S630, the control process P30 proceeds to S640. By the way, the fact that the received VIN code is different from the stored VIN code can mean that the VIN code stored in the engine ECU 30 is overwritten. At S640, the other ECU 51 updates the EEPROM 52 so that the stored VIN code can be overwritten with the received VIN code.

Then, the control process P30 proceeds to S650, where the other ECU 51 clears vehicle fault information stored in the other ECU 51. Then, the control process P30 proceeds to S660, where the other ECU 51 clears vehicle individual information stored in the other ECU 51. Then, the control process P30 ends. For example, in the other ECU 51, the vehicle fault information and the vehicle individual information are stored in the EEPROM 52.

In the sixth embodiment, S600 and S610 can serve as another identification information transmitting device. The EEPROM 52 and S640 can serve as another identification information memory device. S630 can serve as another determination device.

According to the sixth embodiment, the vehicle fault information and the vehicle individual information stored in the other ECU 51 can be cleared immediately when the vehicle fault information and the vehicle individual information stored in the engine ECU 30 are cleared. In this way, the vehicle fault information and the vehicle individual information stored in the other ECU 51 can be cleared automatically. That is, the sixth embodiment can have the same effect as the fourth and fifth embodiments. It is noted that the engine ECU 30 can perform the control process P30 illustrated in FIG. 9.

(Modifications)

The embodiments described above can be modified in various ways. For example, a process for determining whether the VIN code is overwritten can be added after S160 and S190. In this case, vehicle information such as the vehicle fault information and the vehicle individual information can be cleared upon determination that the VIN code is overwritten.

In the third embodiment, the clear flag can be commonly shared among the vehicle individual information items. In the fourth embodiment, S320 can be added after S330. This is to the same effect as the second embodiment. In the sixth embodiment, S180 can be added after S200. This is to the same effect as the second embodiment. In the fourth to sixth embodiments, the EEPROM 52 of the other ECU 51 can store the vehicle individual information and the clear flag in a manner shown in FIG. 4. That is, the clear flag can be respectively associated with each vehicle individual information item and stored in the EEPROM 52.

Such changes and modifications are to be understood as being within the scope of the present invention as defined by the appended claims.

What is claimed is:

1. An electronic control apparatus for a vehicle comprising:
an identification information memory device for storing vehicle identification information uniquely assigned to the vehicle;
an individual information memory device for storing vehicle individual information related to the vehicle, the vehicle individual information including control information used for control of the vehicle and fault diagnosis information representing a fault diagnosis of a predetermined section of the vehicle;
a memory control device for overwriting old vehicle identification information stored in the identification information memory device with new vehicle identification information, the old vehicle identification information being previously written to the identification information memory device and currently stored in the identification information memory device;
a clear device for clearing at least the fault diagnosis information of the vehicle individual information from the individual information memory device when the memory control device overwrites the old vehicle identification information;
an abnormality determination device for determining whether the old vehicle identification information is abnormal by a checksum method, a mirror data method, or a majority method in response to an overwrite command to overwrite the old vehicle identification information;
an equality determination device for determining whether the old vehicle identification information is equal to the new vehicle identification information upon determination of the abnormality determination device that the old vehicle identification information is normal; and
a clear control device for performing a clear control, the clear control enabling the clear device to clear both the control information and the fault diagnosis information of the vehicle individual information upon determination of the equality determination device that the old vehicle identification information is different than the new vehicle identification information, the clear control disabling the clear device from clearing both the control information and the fault diagnosis information of the vehicle individual information upon determination of the equality determination device that the old vehicle identification information is equal to the new vehicle identification information,
wherein
the memory control device overwrites the old vehicle identification information upon determination of the abnormality determination device that the old vehicle identification information is abnormal determination of the equality determination device that the old vehicle identification information is different than the new vehicle identification information,
the memory control device does not overwrite the old vehicle identification information when the equality determination device determines that the old vehicle identification information is equal to the new vehicle identification information,
the clear control device is capable of performing the clear control upon determination of the abnormality determination device that the old vehicle identification information is normal, and
the clear control device performs a clear disable control upon determination of the abnormality determination device that the old vehicle identification information is abnormal, the clear disable control disabling the clear device from clearing the control information of the vehicle individual information.

2. The electronic control apparatus according to claim 1, further comprising:
a clear information memory device for storing clear information representing whether the vehicle individual information is enabled to be cleared, wherein
the clear control device performs a clear determination control instead of the clear disable control upon determination of the abnormality determination device that the old vehicle identification information is abnormal, the clear determination control enabling the clear device to clear the vehicle individual information irrespective of the determination of the equality determination device when the clear information represents that the vehicle individual information is enabled to be cleared, the clear determination control disabling the clear device from clearing the vehicle individual information irrespective of the determination of the equality determination device when the clear information represents that the vehicle individual information is disabled to be cleared.

3. The electronic control apparatus according to claim 2, wherein
the vehicle individual information comprises a plurality of vehicle individual information items having different types of information,
the clear information comprises a plurality of clear information items, each clear information item representing whether a corresponding vehicle individual information item is enabled to be cleared, and
the clear determination control enables the clear device to clear the vehicle individual information item when the clear information item represents that the vehicle individual information item is enabled to be cleared, the clear determination control disabling the clear device from clearing the vehicle individual information item when the clear information item represents that the vehicle individual information item is disabled to be cleared.

4. The electronic control apparatus according to claim 1, wherein
the vehicle individual information further includes a learned value used for control of the vehicle.

5. A vehicle control system comprising:
a plurality of electronic control apparatus configured to communicate with each other, each electronic control apparatus comprising:
an identification information memory device for storing vehicle identification information uniquely assigned to the vehicle;
an individual information memory device for storing vehicle individual information related to the vehicle, the vehicle individual information including control information used for control of the vehicle and fault diagnosis information representing a result of a fault diagnosis of a predetermined section of vehicle;
a memory control device for overwriting old vehicle identification information stored in the identification information memory, device with new vehicle identification information, the old vehicle identification information being previously written to the identification information memory device and currently stored in the identification information memory device;

a clear device for clearing at least the fault diagnosis information of the vehicle individual information from the individual information memory device when the memory control device overwrites the old vehicle identification information;

an abnormality determination device for determining whether the old vehicle identification information is abnormal by a checksum method, a mirror data method, or a majority method in response to an overwrite command to overwrite the old vehicle identification information;

an equality determination device for determining whether old vehicle identification information is equal to the new vehicle identification information upon determination of the abnormality determination device that the old vehicle identification information is normal; and a clear control device for performing a clear control, the clear control enabling the clear device to clear both the control information and the fault diagnosis information of the vehicle individual information upon determination of the equality determination device that the old vehicle identification information is different than the new vehicle identification information, the clear control disabling the clear device from clearing both the control information and the fault diagnosis information of the vehicle individual information upon determination of the equality determination device that the old vehicle identification information is equal to the new vehicle identification information, wherein the memory control device overwrites the old vehicle identification information upon determination of the abnormality determination device that the old vehicle identification information is abnormal or upon determination of the equality determination device that the old vehicle identification information is different than the new vehicle identification information, the memory control device does not overwrite the old vehicle identification information when the equality determination device determines that the old vehicle identification information is equal to the new vehicle identification information, and the clear control device is capable of performing the clear control upon determination of the abnormality determination device that the old vehicle identification information is normal.

6. The vehicle control system according to claim 5, wherein a first one of the plurality of electronic control apparatus includes a clear command transmitting device for transmitting a clear command when the old vehicle identification information is overwritten, a second one of the plurality of electronic control apparatus includes a clear command receiving device for receiving the clear command, and in the second one of the plurality of electronic control apparatus, the clear control device causes the clear device to clear the vehicle individual information when the clear command receiving device receives the clear command.

7. The vehicle control system according to claim 5, wherein each of the plurality of electronic control apparatus includes a communication device for communicating with an external apparatus, the external apparatus outputting the overwrite command, each electronic control apparatus further including a monitor device for monitoring communication between the external apparatus and another one of the plurality of electronic control apparatus, the monitor device determining whether the old vehicle identification information is overwritten in the other electronic control apparatus, and in each electronic control apparatus, the clear control device causes the clear device to clear the vehicle individual information when the monitor device determines that the old vehicle identification information is overwritten in the other electronic apparatus.

8. The vehicle control system according to claim 5, wherein each of the plurality of electronic control apparatus includes an identification information transmitting device for transmitting the vehicle identification information to another one of the plurality of electronic control apparatus, each electronic control apparatus further including another identification information memory device for storing the vehicle identification information received from the other electronic control apparatus, each electronic control apparatus further including another determination device for determining whether the vehicle identification information received from the other electronic control apparatus is equal to the vehicle identification information stored in the other identification information memory device, and in each electronic control apparatus, the clear control device causes the clear device to clear the vehicle individual information when the other determination device determines that the vehicle identification information received from the other electronic control apparatus is equal to the vehicle identification information stored in the other identification information memory device.

9. The electronic control apparatus according to claim 5, wherein the vehicle individual information further includes a learned value used for control of the vehicle.

10. The vehicle control system according to claim 5, wherein the clear control device performs a clear disable control upon determination of the abnormality determination device that the old vehicle identification information is abnormal, the clear disable control disabling the clear device from clearing the vehicle individual information irrespective of the determination of the equality determination device.

* * * * *